Nov. 13, 1951 W. AMES 2,574,723
GAUGE
Filed Dec. 2, 1944 3 Sheets-Sheet 1
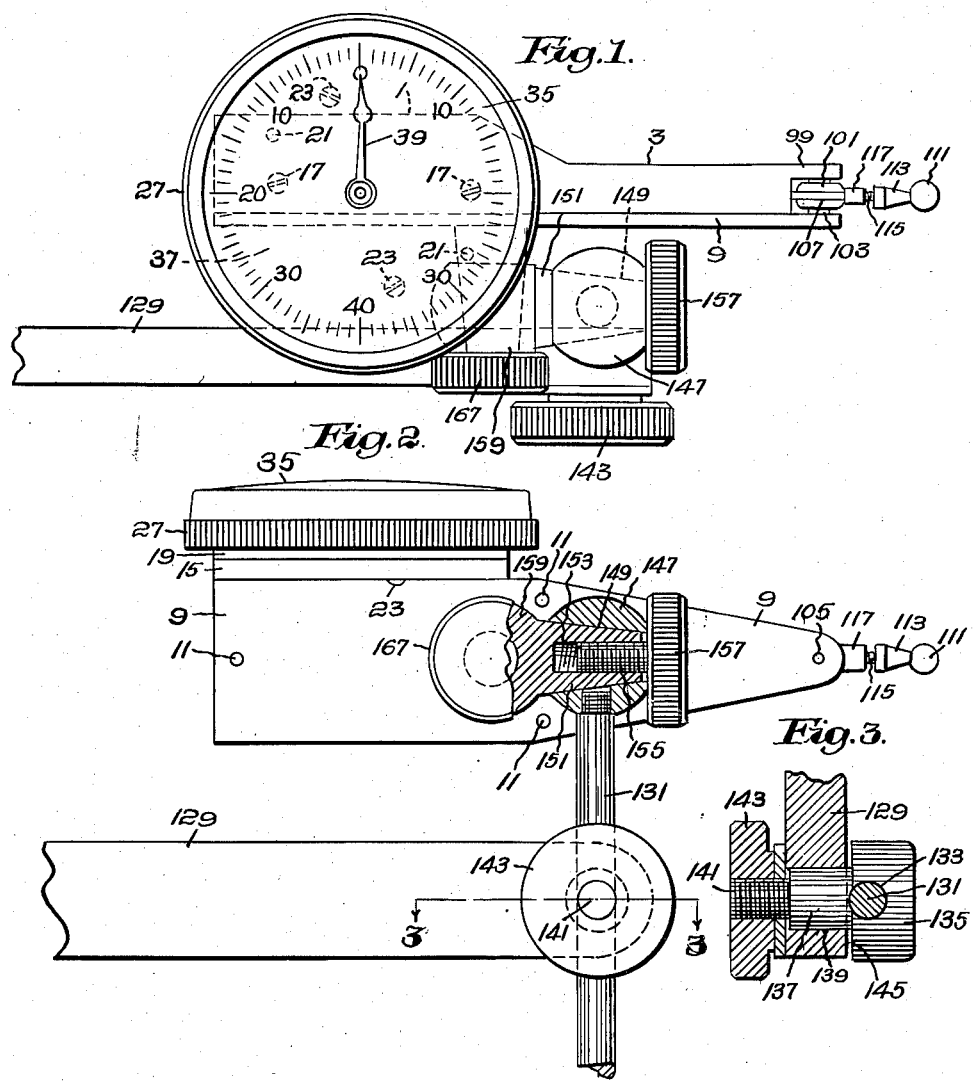
Inventor:
Warren Ames,
by Emery Booth Townsend Miller & Weidner
Attys Nov. 13, 1951  W. AMES  2,574,723
GAUGE
Filed Dec. 2, 1944  3 Sheets-Sheet 2
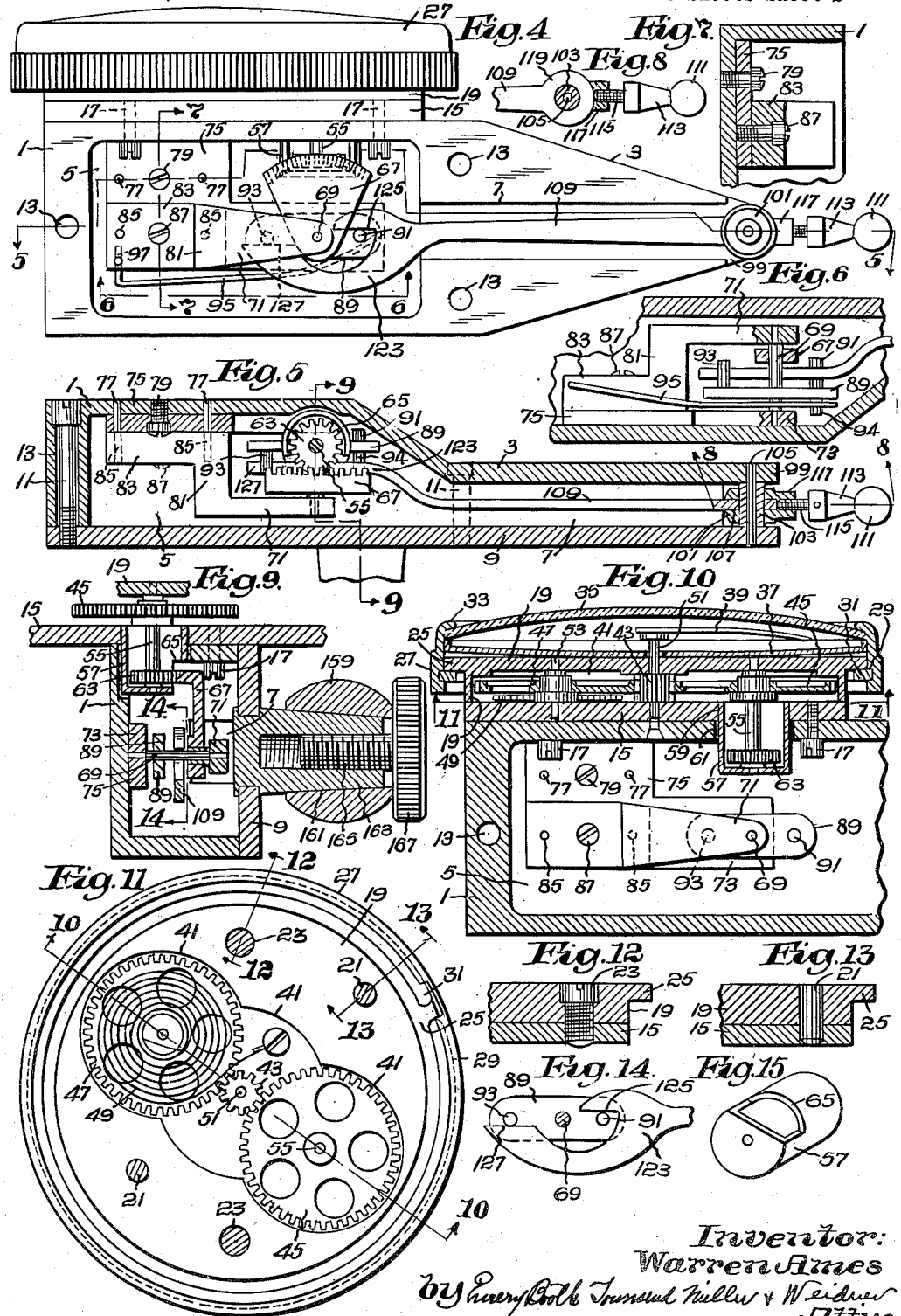

Nov. 13, 1951     W. AMES     2,574,723
GAUGE
Filed Dec. 2, 1944     3 Sheets-Sheet 3
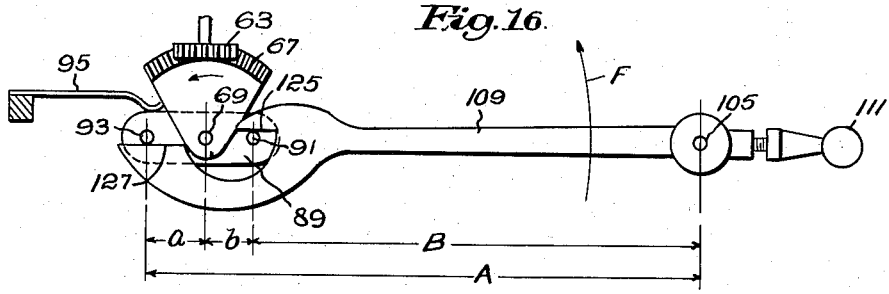
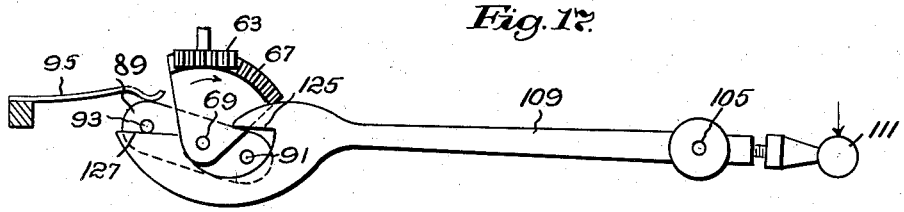
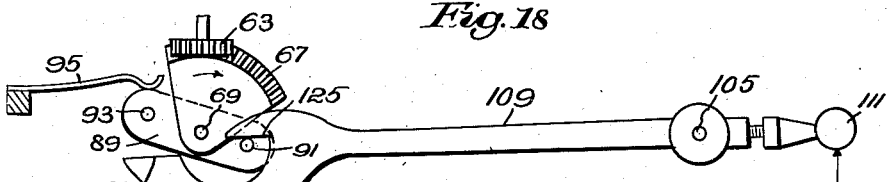
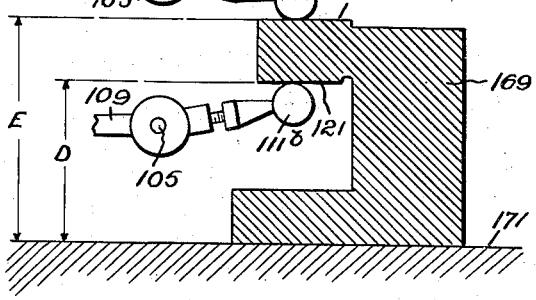
Inventor:
Warren Ames.

Patented Nov. 13, 1951

2,574,723

UNITED STATES PATENT OFFICE 2,574,723

GAUGE

Warren Ames, Newton, Mass., assignor to B. C. Ames Co., Waltham, Mass., a corporation of Massachusetts Application December 2, 1944, Serial No. 566,277

2 Claims. (Cl. 33—172)

My invention relates to gauges, particularly but not exclusively to one of the dial micrometer type, for example, one for comparing linear dimensions of work with a standard.

It has heretofore been proposed to provide a comparator gauge with a contact feeler designed to contact with work surfaces facing in different directions so as to make the gauge applicable for use in a wide variety of situations, for example, to enable it to contact with either an upwardly facing surface or a downwardly facing surface, and, no matter in which direction the surface faces, to have the gauge indicator move in the same direction for an oversize of the work as for an undersize of the work. To make such a gauge of widest application commonly requires its indicator to be positioned at one side of the line of movement of the contact feeler, and to have the general plane of the gauge dial at an angle to such line, say normal thereto. The mechanism heretofore proposed for transmitting motion of the contact feeler to the indicator of such a gauge has involved many undesirable complications, for example, a manually operated motion reversing device which is shifted and set by the operator for causing the indicator to move in the same direction when the contact feeler is applied, for example, to an upwardly facing surface as when applied to a downwardly facing surface. Such shiftable device has many disadvantages for, besides complicating the gauge mechanism, it acts to confuse the operator because failure to shift it, or to realize the necessity of shifting it, may cause the operator to believe the gauge is indicating oversizes when in fact it is indicating undersizes, or vice versa.

The present invention has among its objects to avoid the above objections by entirely eliminating the necessity of such manually operated motion reversing mechanism, and at the same time provide the gauge with an improved and simplified mechanism for transmitting the motion of the contact feeler to the indicator. However, the invention will be best understood from the following description when read in the light of the accompanying drawings of an embodiment thereof selected for illustrative purposes, while the scope of the invention will be more particularly pointed out in the appended claims.

In the drawings—

Fig. 1 is a plan of one form of gauge according to the invention;

Fig. 2 is a side elevation of the gauge according to Fig. 1 with parts broken away;

Fig. 3 is a section on the line 3—3 of Fig. 2 with parts in elevation;

Fig. 4 is an elevation of the gauge, according to Figs. 1 and 2, with the cover of the support removed;

Figs. 5, 6 and 7 are, respectively, sections on the lines 5—5, 6—6 and 7—7 of Fig. 4, with parts omitted and parts broken away and parts in elevation in Figs. 6 and 7;

Fig. 8 is a section on the line 8—8 of Fig. 5;

Fig. 9 is a section on the line 9—9 of Fig. 5;

Fig. 10 is a section on the line 10—10 of Fig. 11 with parts in elevation;

Fig. 11 is a section on the line 11—11 of Fig. 10;

Figs. 12 and 13 are, respectively, sections on the lines 12—12 and 13—13 of Fig. 11 with parts omitted;

Figs. 14 and 15 illustrate details; and

Figs. 16 to 19 inclusive are diagrams illustrating the operation of the gauge.

Referring to the drawings, the gauge illustrated comprises a support in the form of a casing having a body portion 1, and, integral with said portion, a tapered projecting portion 3 of reduced cross-section. As shown, the body portion 1 is formed with an elongated cavity 5 (Figs. 4 and 5) and the extension with a communicating passage 7 extending lengthwise of said extension and opening on the free end thereof. Both the cavity and passage are shown as opening laterally on one face of the body portion and extension of the support, and are closed by a cover plate 9 secured to said portion and extension by the screws 11 (Figs. 1 and 5), which screws extend through the holes 13 (Fig. 4) and are tapped into the cover plate.

Carried by the above described support is a dial micrometer indicating mechanism which, as illustrated, comprises a back plate 15 (Figs. 2, 4, 9 and 10) detachably secured to one edge of the body portion of the support by the screws 17. In the form of the mechanism shown, resting on the back plate is a front plate 19 positioned in proper angular relation thereto by the dowels 21 (Figs. 1, 11 and 13) and secured in assembled relation therewith by the screws 23. As shown, the front plate is provided at its edge opposite the back plate with a circumferential radially extending flange 25, over which flange rotatably fits a bezel ring 27. For detachably securing the bezel ring to the front plate, the bezel ring is provided adjacent its lower edge with an interior circumferential groove 29 into which removably fits a split ring 31 bearing against the under side of the flange 25. At its upper edge the bezel ring is provided at its interior side with a radially extending circumferential flange 33 against which abuts a crystal 35. As shown (Fig. 10), the graduated dial 37 of the indicating mechanism is cup-shaped and resilient. Adjacent its axis the dial bears against the upper side of the front plate, while its rim bears against the under side of the crystal at the edge of the latter, the dial because of its resiliency therefore acting to hold the crystal in place and to hold the split ring 31 in frictional engagement with the under side of the flange 25. In this way the bezel and dial may be rotated as a unit relative to the front plate for positioning the indicator hand 39 in proper relation to the graduations on the dial, say for placing the hand in registry with the zero mark of said graduations.

As illustrated, the lower face of the front plate 19, which face contacts with the upper face of the back plate 15, is recessed as indicated at 41 (Figs. 10 and 11) for receiving the center pinion 43 and gears 45 and 47 meshing therewith, the last mentioned gear having associated therewith the hair spring 49 for taking up back lash. The center pinion 43 is fixedly mounted on a spindle 51, which latter, as clearly illustrated by Fig. 10, is journalled at opposite ends in the front and back plates, respectively. The take up gear 47 similarly is mounted on a spindle 53 also journalled in the front and back plates. The gear 45 is fixedly carried by a spindle 55, which, as illustrated in Fig. 10, is journalled at its upper end in the front plate and at its lower end in the bottom wall of a tubular member 57. The upper open end of this tubular member is fixedly inserted in an opening 59 in the back plate of the gauge of the dial indicating mechanism and extends through an opening 61 in the body portion of the support into the cavity 5 thereof. At its lower end the spindle 55 fixedly carries a gear 63 constituting the driving gear for the dial indicating mechanism.

As shown (Figs. 9 and 15), the tubular member 57 adjacent the gear 63 is provided with a notch 65 exposing a portion of the periphery of said gear to the interior of the cavity 5 of the support, and meshing with such exposed portion is a crown gear 67. As shown, this crown gear is fixedly carried by a spindle 69 positioned at right angles to the spindle 55. As illustrated, the spindle 69 is journalled at one end in the end of an arm 71 and at its opposite end in the end of an extension 73 of a plate 75. This plate is positioned on the bottom surface of the cavity 5 by dowels 77, and is detachably secured to said bottom by a screw 79. The arm 71 is formed integrally with a lateral extension 81 (Fig. 6) formed integrally with a base portion 83 which rests on the plate 75 and is positioned relative to said plate by dowels 85 and secured to the plate by a screw 87.

Fixedly carried by the spindle 69 in spaced relation to the crown gear 67 is shown an arm 89 (Figs. 4, 6, 9, 10 and 14), this arm fixedly carrying a pair of pins 91 and 93 at opposite sides of the spindle in parallel relation thereto. The lower end of the pin 91, as viewed in Fig. 6, is shown as extending entirely through the arm to project below it, as indicated at 94 (Fig. 6) and bearing against this projecting end of the pin is the free end of a wire-like spring 95, the end of the spring remote from the pin being fixedly received in an opening 97 (Fig. 4) in the base portion 83 of the arm 71, in which latter the upper end of the spindle 69 is journalled.

As shown, the projection 3 of the support at its free end has an ear 99 (Figs. 1 and 4). Between this ear and the corresponding end of the cover plate 9 is positioned a head 101 (Figs. 1, 4 and 5), the head being fixedly carried by a bushing 103, through which latter fixedly extends a pivot pin 105 journalled at opposite ends in the ear 99 and the portion of the cover plate 9 opposite said ear, respectively. The head is shown as formed with a slot 107 which receives the end of a lever 109 rotatably mounted on the bushing 103. The contact feeler illustrated is in the form of a spherical head 111 having a radially projecting shank 113, the latter terminating in a screw-threaded portion 115 received by the boss 117 formed as an integral part of the head 101. The end portion of the lever 109, which portion is journalled on the bushing 103, has, as shown in Fig. 4, an arcuate periphery against which the screw-threaded portion 115 of the shank bears, by which construction the contact feeler may be turned into various angular positions relative to the lever and clamped in such positions by causing the end of the shank 113 to bear against this peripheral portion of the lever, for example, into the position 111a or 111b diagrammatically illustrated by Fig. 19 to adapt the contact feeler for use in connection with, for example, either an upwardly facing surface 119 or a downwardly facing surface 121.

The lever 109 extends through the passage or opening 7 into the cavity 5 where it is provided with an offset portion 123 presenting a downwardly facing surface 125, as viewed in Figs. 4 and 14, adapted to contact with the upper side of the pin 91, and presenting an upwardly facing surface 127 adapted to contact with the lower side of the pin 93.

The gauge may be supported in any convenient manner, for example, it may be attached to the post of a lathe, or to a support adapted to rest upon a surface plate or the like, by means of a bar 129 (Figs. 1 and 2). As shown, attached to the end of the bar is a rod 131 slidably and rotatably extending through an opening 133 of a head 135, which head has integrally formed therewith a shank 137 rotatably extending through an opening 139 in the bar to the opposite side thereof from the head 135. This shank, as shown, is provided with a screw-threaded reduced diameter portion 141 on which is a clamping nut 143. The opening 133 in the head is so positioned that a side of the rod extends laterally beyond that surface 145 of the head which is adjacent the bar 129. By this construction the rod 131 may be clamped in various adjusted positions angularly of the bar 129 in two directions at right angles to each other, and in various adjusted positions longitudinally of the rod. At its upper end the rod carries a head 147 which is formed with a frusto-conical opening 149 rotatably receiving a frusto-conical shank 151. Screw-threaded into an axial opening 153 of the shank 151 is a screw 155 carrying a head 157 adapted to bear against the head 147 for clamping the shank in various adjusted positions relative to this last mentioned head. The shank 151 carries a head 159 (Figs. 1, 2 and 9) formed with a frusto-conical opening 161 into which fits a shank 163 fixedly carried by the cover plate 9 of the support, the shank being adapted to be clamped in various adjusted positions relative to the head 159 by the screw 165 having the head 167 bearing against a side of the head 159. By this construction the support may be placed into any position relative to the supporting bar 129 and clamped in that position.

The operation of the gauge may be best understood from the diagrams shown by Figs. 16 to 19. It will be observed from Fig. 16 that the spring 95 tends to rotate, in a counter-clockwise direction, the crown gear 67 and bar 89 carrying the pins 91 and 93. As these pins bear against the lever abutment surfaces 125 and 127, respectively, in the position of the parts shown in Fig. 16 the spring 95 tends to rotate the entire system of movable parts, including the lever 109, in the direction of the arrow F about the center afforded by the spindle 69. However, this rotation is resisted by the pivot pin 105 of the lever 109. Consequently the parts in their position shown by Fig. 16 are restrained against movement in so far as the force exerted by the spring is concerned, the pivot pin 105 being so positioned that the lever 109 is free to swing, about its pivotal axis, in the passage 7 in either of opposite directions under the influence of the contact feeler. When the contact feeler 111 is moved downward from its position shown by Fig. 16 to its position shown by Fig. 17 the lever rocks about the pivot pin 105 to move both abutment surfaces 127 and 125 upward. This causes the pin 93 in contact with the surface 127 to rock the bar 89 and crown gear 67 clockwise against the resistance of the spring 95, the pin 91 and the surface 125 moving out of contact. When the contact feeler is moved upward from its position shown by Fig. 16 to its position shown by Fig. 18 the lever 109 is rocked about the pivot pin 105 to move both abutment surfaces 125 and 127 downward, the surface 125 cooperating with the pin 91 to move the bar 89 and crown gear 67 again in a clockwise direction against the resistance of the spring 95, the pin 93 and abutment surface 127 moving out of contact. Hence no matter whether the contact feeler 111 is moved upward or downward from its position shown by Fig. 16 the crown gear is rotated in the same direction, and when it is moved downward the surface 125 is inoperative, while when it is moved upward the surface 127 is inoperative.

As shown, the pin 93 is offset from the spindle 69 a distance $a$ (Fig. 16) greater than the distance $b$ the pin 91 is offset from said spindle, so that the ratio between the distance $b$ and the distance B of the pin 91 from the spindle 105 is the same as the ratio between the distance $a$ and the distance A of the pin 91 from the spindle 105, the purpose of which is to cause upward movement of the contact feeler a given distance to turn the crown gear through the same angle as it will be turned by the contact feeler when the latter is moved the same distance downward.

Assuming the gauge is to compare the distance D or E (Fig. 19) of the surfaces 121 or 119, respectively, of the work 169 from the surface plate 171 on which the work rests, the contact feeler 111 will be first applied to a test block resting on the surface plate corresponding to a standard of measurement for the distance D or E, in which case the contact feeler will be in the position represented by Fig. 17 when the distance D of the work is to be compared with the standard, and will be in the position represented by Fig. 18 when the distance E of the work is to be compared with the standard, it being observed in each case that the spring 95 will tend to move the contact feeler into contact with the standard. When the contact feeler is applied to the standard the bezel of the dial may be rotated to set the zero mark of the dial graduations under the indicator hand 39. The standard may then be removed and the work applied to the contact feeler, and in either case an undersize in the distance D or E (meaning that too much material has been machined off to finish the surface 119 or 121) will cause the indicator hand to be moved in the same direction, and similarly an oversize in either of said distances (meaning that not enough material has been machined off to finish the surface 119 or 121) will cause the indicator hand to be moved in the same direction, in one case clockwise and in the other case counterclockwise, so that there is no possibility of confusion on the part of the operator such as above described is liable to be caused with a gauge having a manually shiftable mechanism for causing the indicator hand to move in the same direction under these two conditions.

It will be observed that the hair spring 49 of the dial indicating mechanism tends to move the parts in a contrary direction to the spring 95 and hence acts to take up back lash in the gears, the spring 95 being more powerful than the spring 49 so that the latter is ineffective to move the crown gear.

It will also be observed that the operative part of the row of teeth on the crown gear is that portion thereof which lies to the left of the point of meshing of that row with the gear 63, as viewed in Figs. 4 and 5, for which reason the crown gear may, if desired, be positioned on the spindle 69 in angularly displaced position counter-clockwise to its position shown by Fig. 4.

With the construction above described the dial micrometer mechanism, including the tubular member 57, spindle 55 and driving gear 63 carried by the casing of that mechanism, can be fabricated and assembled as a unit and detachably secured to the support by the screws 17. Likewise the mechanism comprising the plate 75, arm 77 secured to said plate, the spindle 69 and parts carried by said spindle, and the spring 95 can also be fabricated and assembled as a separate unit and detachably secured to the support by the screw 79. The lever 109 and contact feeler 111 carried by it also can be separately fabricated and assembled as a unit. As the gear 63 and crown gear 67 detachably intermesh, and as the lever and pins 91 and 93 have a non-positive contact with each other in the assembled instrument, and the lever may be lifted out of the passage 7 when the cover plate 9 is removed, the instrument may be assembled, and any of the enumerated units be removed for repair or replacement, with great facility.

It will be understood that within the scope of the appended claims wide deviations may be made from the form of the invention described without departing from the spirit of the invention.

I claim:

1. A gauge of the character described having, in combination, a dial indicator mechanism unit comprising a cooperating dial and indicator hand and multiplying gearing for moving said hand, a casing supporting said dial and hand and housing said gearing, said gearing comprising a driving spindle extending through the wall of said casing to the exterior thereof, which spindle carries a gear at the exterior of said casing for rotating said spindle; a support having a cavity provided with an opening leading to the exterior of said support; means for detachably securing said casing to said support with said spindle extending through said opening to position said gear within said cavity; said cavity also being provided with a second opening leading to the exterior of said support; a contact feeler and lever carrying said feeler adapted to be detachably secured to said support as a unit, with said lever extending through said second opening into said cavity; motion transmitting means for operatively connecting the portion of said lever within said cavity to said gear, which means comprises a second gear adapted to mesh detachably with the first mentioned gear and also comprises a spring for urging said second gear in one direction, said motion transmitting means and said lever being formed to provide a non-positive detachable contact between them for causing said lever to transmit its motion to said means, a mounting carrying said motion transmitting means as a unit therewith, and means for detachably securing said mounting to said support with the motion transmitting means within said cavity; whereby the three enumerated units may be separately made and assembled and attached to said support in cooperating relation, and may be separately removed from said support independently of each other.

2. A gauge of the character described having, in combination, a dial indicator mechanism unit comprising a casing carrying at its exterior a spur gear for driving such mechanism; a supporting casing having an opening; means for detachably securing said casing of said indicator mechanism unit to said supporting casing with said spur gear projecting axially through said opening for positioning said spur gear within said supporting casing; said supporting casing having a second opening, a lever carrying a contact feeler at the exterior of said supporting casing projecting through said second opening into said supporting casing, which lever is swingingly mounted on said supporting casing; motion transmitting mechanism within said supporting casing for operatively connecting said lever to said spur gear for operating the indicator mechanism unit, a mounting carrying said motion transmitting mechanism as a unit therewith, which mounting is detachably carried by said supporting casing; said motion transmitting mechanism comprising a spindle transverse to the axis of said spur gear carrying a crown gear meshing with said spur gear, whereby when either the dial indicator mechanism unit or motion transmitting mechanism unit is moved into or out of attached relation with said supporting casing by movement axially of said spur gear while the other of said units is attached to such casing said spur gear and crown gear will be relatively moved into or out of meshing relation; said motion transmitting mechanism and lever being formed to provide a non-positive detachable connection between them for causing motion of said lever to operate such mechanism while causing them to be moved into or out of attached or detached relation, respectively, when said mounting is moved into attached or detached relation with said supporting casing; whereby the two enumerated units may be separately made, and assembled and attached to said supporting casing in cooperating relation with each other and said lever, and may be separately removed from said supporting casing independently of each other.

WARREN AMES.

REFERENCES CITED

The following references are of record in the file of this patent:

UNITED STATES PATENTS

| Number | Name | Date |
| --- | --- | --- |
| 820,303 | Hansen | May 8, 1906 |
| 1,380,580 | Nell | June 7, 1921 |
| 1,436,111 | Reich | Nov. 21, 1922 |
| 1,466,664 | Lowe | Sept. 4, 1923 |
| 1,618,785 | Sooy | Feb. 22, 1927 |
| 1,645,473 | Cash | Oct. 11, 1927 |
| 1,820,370 | Aldeborgh | Aug. 25, 1931 |
| 2,129,311 | Street | Sept. 6, 1938 |
| 2,167,230 | Avigdor | July 25, 1939 |
| 2,171,022 | Brown | Aug. 29, 1939 |

FOREIGN PATENTS

| Number | Country | Date |
| --- | --- | --- |
| 331,974 | Germany | Jan. 17, 1921 |
| 556,199 | Great Britain | Sept. 23, 1943 |